United States Patent [19]
Valenti

[11] Patent Number: 4,764,858
[45] Date of Patent: Aug. 16, 1988

[54] ENERGY CONTROLLER

[75] Inventor: Leo Valenti, East Greenwich, R.I.

[73] Assignee: Gulton Industries, Inc., East Greenwich, R.I.

[21] Appl. No.: 110,112

[22] Filed: Oct. 19, 1987

[51] Int. Cl.$^4$ ........................ G01D 15/10; H02P 13/24
[52] U.S. Cl. ...................................... 363/89; 219/216; 346/76 PH
[58] Field of Search .................... 363/84, 85, 86, 87, 363/88, 89, 125, 126; 219/216 PH; 346/76 PH; 400/120

[56] References Cited

U.S. PATENT DOCUMENTS

| | | | |
|---|---|---|---|
| 3,979,661 | 9/1976 | Matz | 363/89 |
| 4,119,907 | 10/1978 | Quinn | 363/89 |
| 4,594,501 | 6/1986 | Culley et al. | 219/216 PH |
| 4,684,959 | 8/1987 | Mori et al. | 346/76 PH |
| 4,704,618 | 11/1987 | Gotoh et al. | 346/76 PH |

*Primary Examiner*—Peter S. Wong
*Attorney, Agent, or Firm*—Darby & Darby

[57] ABSTRACT

A circuit for delivering a predetermined amount of energy to a load without regulating the voltage across the load is described. An a.c. or rectified sine wave is controlled. There is no capacitive smoothing of the applied voltage. A time counter is activated at the beginning of each half cycle of the sine wave. At a predetermined point in time, a switch is closed and power is delivered to the load. At another predetermined time in the same half cycle, the actual applied voltage is measured. The detected voltage value and corresponding time of measurement comprise a unique signature enabling identification of the specific sine function for that half cycle. The sine function signature permits calculation of either the amount of total energy delivered or the RMS voltage level as a function of progressing time, and thus, determination of the time period for which the line switch must remain closed in order to deliver the predetermined amount of total energy, or to maintain a predetermined RMS voltage. When the time counter reaches the computed necessary time period, the switch opens and power delivery is stopped.

9 Claims, 3 Drawing Sheets

ENERGY CONTROLLER

BACKGROUND OF THE INVENTION a. Field of the Invention

This invention relates generally to a circuit for controlling the amount of energy delivered to a load. More specifically, the invention relates to electrical energy supply for devices or apparatus which do not require fixed regulated voltages. An example of such a device is a thermal recording system which includes a plurality of heat-producing elements arranged in the form of an array, where each heat-producing elements requires a predetermined amount of energy, regardless of voltage level, to form a mark of predetermined quality or contrast, on a thermal-sensitive recording medium.

b. Description of the Prior Art

A wide variety of electrical devices and machines employ regulated power supplies to accurately control the energy actually delivered to a known load. Generally, a predetermined constant voltage is provided for a predetermined fixed period of time in devices requiring pulsed energy. In other devices where constant power is needed, an accurately predetermined voltage is constantly supplied. If power to a load is regulated for a predetermined amount of time then energy delivered to that load is also being controlled. The voltage parameter of conventional power supplies is generally regulated to remain constant.

Regulated power supplies, however, add cost and bulk to electrical equipment, in that relatively bulky load capacitors and other circuit components involved in voltage regulation are necessary.

Furthermore, it is important to match maximum power requirements of a load with the power output of a conventional power supply to ensure that the load will receive sufficient power. The cost of the power supply's regulating circuitry and its weight increase, however, with increasing power output. Product design restrictions usually necessitate consideration of average power requirements of the load in order to minimize the cost and weight of the power supply. The potential savings in power supply cost and weight are generally traded against the performance of the product.

In the particular field of thermal printing systems, information is "printed" on a thermal-sensitive recording medium through the use of a conventional thermal printhead. The thermal printhead generally includes a plurality of electrically resistive elements or "dots" arranged in a linear array. A printhead array may typically be made up of as many as 1600 or more individual resistive dots. Each dot is a fixed resistor which converts delivered electrical energy into heat energy. The heat energy causes nearby heat-sensitive paper to react so as to create a corresponding dark dot on the recording medium. These dots form on an advancing sheet medium a predetermined alphanumeric character or graphic symbol, as is well known in the art.

Such resistor dots may have a typical average power rating of approximately one watt per dot. The maximum power required by the entire printhead array in the case of a 1600 dot array, would be 1600 watts peak, if the entire array is to be energized at once. This would require a 1600 watt peak power supply to ensure that each dot could operate successfully. Due to the cost and bulk of certain electrical components, such as load capacitors, commonly found in conventional voltage regulating circuitry, the cost of a 1600 watt peak power supply might approach or surpass the intended cost of the entire thermal printer. Also, a 1600 watt peak power supply would be larger than the typical size of conventional thermal printers.

A currently conventional solution to the aforementioned problem is to provide, in a thermal printer, a regulated power supply which is rated for the average power requirements of the dot array, for example 200 watts. However, the 200 watt power supply could conceivably supply 400 watts of peak power (reserved capacitance) but would be incapable of providing power to address the 1600 watt peak load requirement. Thus, the printhead array is divided into several (e.g., four or more) segments, the printer circuitry then being designed to energize the four segments separately and staggered sequentially in some fashion. The heat-sensitive paper-recording medium be held stationary for the four energy pulse periods in this case. Thus it can be seen that the conventional power supply directly limits the speed of thermal printer operation.

Another solution is disclosed in U.S. Pat. No. 4,684,959, issued Aug. 4, 1987, to M. Mori et al., and assigned to Ricoh Company, Ltd. Broadly, Mori et al. disclose a power supply which includes a transformer having its primary side connected to an alternating current (a.c.) line, a rectifying diode connected across the secondary side of the transformer and a capacitor connected in parallel with the diode. Mori et al. state that with such a structure, the pulse width of an activation pulse to be applied to on of the resistors of the thermal printhead is controlled to maintain the product of (detected voltage) squared times (pulse width of applied pulse) substantially constant while monitoring and detecting the voltage to be supplied t the resistive dots for recording.

The system of Mori et al. ('959), while an improvement over previous systems, does not eliminate the use of load capacitance (see, e.g., col. 3, 11. 23, 32–33, 37, 43), often the bulkiest and most expensive component in power regulating circuitry. Although not "regulation" in the ordinary sense, Mori et al. nevertheless teach the use of a load capacitor 13 for smoothing the rectified line voltage. In so doing, the true sinusoidal a.c. (or rectified half-sinusoidal) waveform is eliminated, and accuracy of the energy control system deteriorates. One important cause of this is Mori et al.'s use of an average applied voltage rather than the actual detected applied voltage. As stated at col. 4, 11. 32–38, accuracy of delivered energy is maintained only within $+/-5$ percent, but this accuracy depends on properly matching the energy capacity of capacitor 13 to the known load condition. Thus, the Mori et al. accuracy is load sensitive. This use of a load capacitor presents the same drawbacks as the previously described prior art configuration wherein the resistor dot array of a thermal printer is divided and sequentially energized (including a modest load capacitance).

In the present invention, a precisely predetermined amount of energy is provided to a load without regulating or smoothing the voltage applied across the load in any way. The need for conventional regulating circuitry components is eliminated, resulting in an efficient, low cost, lightweight energy controller.

OBJECTS OF THE INVENTION

A principal object of the present invention is to provide a reliable and simple controller for delivering constant predetermined amounts of energy to a load without the necessity of regulating or smoothing the applied voltage, or altering the voltage sine wave signature in any other manner.

Another object is to reduce the size and cost of various types of electrical equipment. More specifically, it is an object to save energy by controlling delivered RMS (root mean squared) voltage levels and eliminating unnecessary over-supply with its attendant heat generation and dissipation.

Still another object is to improve the reliability of electrical devices and machines by reducing operating temperatures, in turn enabling the use of less expensive electrical (and mechanical) components.

Another object of the invention is to provide an improved thermal printing system which does not require bulky and expensive power regulating circuitry, and which has improved printing speed and consistency of printing.

SUMMARY OF THE INVENTION

The present invention comprises a circuit which delivers a predetermined amount of energy to a load without regulating or smoothing the voltage across the load. The input to the circuit is a sine wave, which is left as an (alternating current) sine wave for a.c. applications, or it can be rectified to provide either a train of direct current (d.c.) positive or negative half duty sine wave cycles for d.c. applications. There is no capacitive smoothing of the applied voltage whatsoever. A time counter is activated at the beginning of each half cycle of the sine wave. At a predetermined point in time, a switch is closed and power is delivered to the load. At another predetermined time in the same half cycle, the actual applied voltage is measured. The detected voltage value and corresponding time of measurement comprise unique signature enabling identification of the specific sine function for that half cycle.

The sine function signature permits calculation, preferrably done beforehand, of the amount of total energy delivered as a function of progressing time, and thus, determination of the time period for which the line switch must remain closed in order to deliver the predetermined amount of total energy. When the time counter reaches the computed necessary time period, the switch opens and power delivery is stopped.

The switching process repeats for the each half duty cycle with a unique turn-off time for each half duty cycle.

It is readily seen that the invention can serve either as an a.c. line voltage RMS regulator or as an unregulated d.c. source.

BRIEF DESCRIPTION OF THE DRAWINGS

Other objects, features and advantages of the invention mentioned in the above brief explanation will be more clearly understood when taken together with the following detailed description of an embodiment which, although presently preferred, will be understood as being illustrative only, and the accompanying drawings reflecting aspects of that example, in which.

DETAILED DESCRIPTION OF A PREFERRED EMBODIMENT

Figure 1:
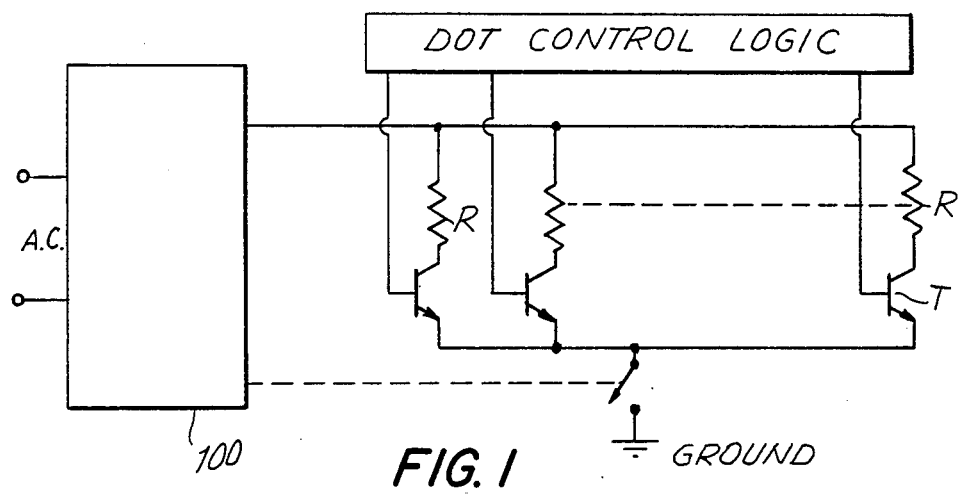
FIG. 1 is a schematic illustration depicting a thermal recording system including the present invention.

FIG. 1 shows well known portions of a thermal recording system in combination with the energy controller 100 according to the present invention. As described in detail below, the energy controller 100 is connected to a conventional a.c. line, and controls the delivery of energy to a plurality of resistive elements R. Determination of which of the resistors R are to print at a given moment is controlled by conventional dot control logic circuitry acting upon switching transistors T, as is well known in the art. When the energy controller closes the switch S to ground, those resistors R whose transistors T are switched ON will print a mark.

Figure 2:
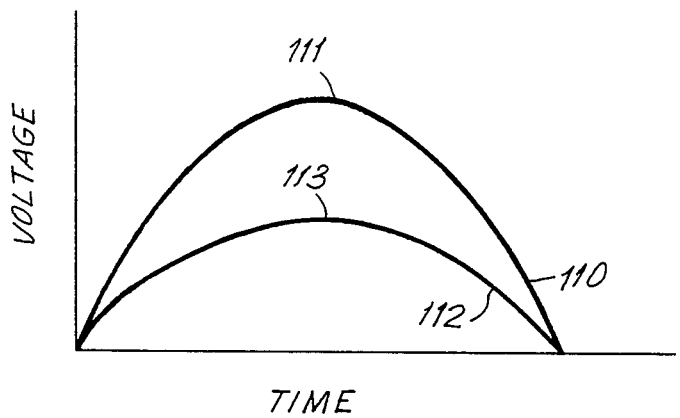
FIG. 2 illustrates voltage amplitude vs. time for one half duty cycle of two different line voltage sine wave functions.

Referring now to FIG. 2, two curves 10, 12 represent two different approximately sinusoidally varying alternating current (a.c.) line voltages as a function of time, as might be representative of the a.c. line voltage of FIG. 1. This variation in voltage is due to line voltage variation and/or voltage drop incurred by load variation. A positive sine wave half cycle is illustrated for each of the different curves 110, 112 of FIG. 2. In the case of conventional 60 Hz a.c. line voltage, 120 such half cycles occur per second, each alternating half cycle being of opposite sign. In d.c. applications, after full wave rectification, all half cycles are of the same (whether positive or negative) sign.

As is shown in FIG. 2, voltage curve 110 attains a higher peak voltage 111 than the peak voltage 113 of curve 112. In the case of conventional a.c. line voltage, for example, as provided by a public or private utility, such peak voltage variations are common.

The power (P) delivered to an electrical load such as a resistor is well-known to be equal to the product of the voltage (V) across the resistor and the current (I) through the resistor, expressed in units of watts. Power is related to voltage, current and resistance by the well-known formula:

$$P = IV = V^2/R$$

The amount of energy (E) delivered to a load is equal to the amount of power delivered integrated over the duration of delivery time, expressed in units of joules (j), and is represented mathematically by;

$$E = \int_{t_1}^{t_2} V^2/R \, dt$$

Figure 3:
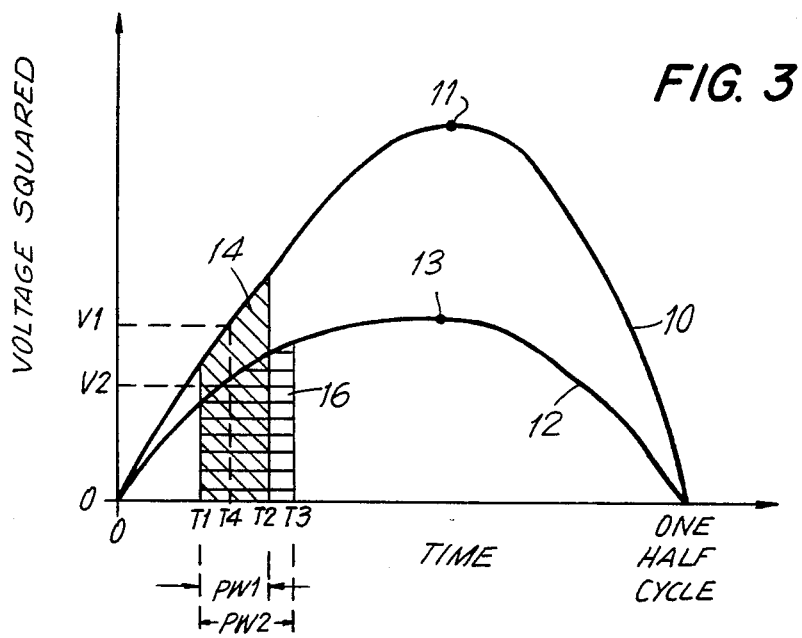
FIG. 3 illustrates voltage squared amplitude vs. time for one half duty cycle of two different line voltage sine wave functions.

The amount of energy delivered to a fixed load of known resistance (R) is thus directly proportional to the integral of the square of the voltage across the resistor and can be graphically represented by the area under the voltage squared curve 10 or 12 shown in FIG. 3.

Accordingly, the amount of energy actually delivered to the load can be precisely controlled by controlling how much of the entire available energy area under the voltage squared curve is actually "sent" to the load. It is readily observed that equal amounts of delivered energy may be obtained from different voltage curves by increasing or reducing, as necessary, the time duration, or pulse width (PW), during which the line voltage is actually applied across the load.

For example, the areas of segments 14 and 16 under curves 10 and 12, respectively, depend on the time width pW1 and PW2 and the voltage over the respective time intervals. Each squared voltage height or amplitude follows a sine curve during the half cycle time and at a given time may vary, due to load and/or power line fluctuations, as shown by the different values V1 and V2 at time T4 for the two sine wave functions 10 and 12.

It will be appreciated that these relationships can be most easily manipulated to predetermine a pulse width (PW) for any given sine wave voltage curve so as to cause delivery of a desired amount of energy to a known load. Where the form of an a.c. line voltage curve such as curves 110 and 112 of FIG. 2 is as follows, as is well-known:

$$V = A \sin(\omega t)$$

then $$E = 1/R \times A^2/2 \times [t_2 - t_1 - (\sin(2\omega t_2) - \sin(2t_1))/2\omega]$$

where
R = Known fixed resistance of load
A = Voltage amplitude for a particular curve, i.e., the sine curve "signature"
$t_1$ = Switch closing time
$t_2$ = Switch opening time Given a known resistance R, desired energy E, and switch closing time t1, there is a unique switch opening time $t_2$ which satisfies the above energy equation, for a particular sine wave signature, A. The sine wave signature, A, may be determined at any convenient time after the zero crossing of a half cycle, by the relationship $$V_{in} = A \sin(\omega t_3)$$

where
$V_{in}$ = detected voltage
$t_3$ = time of voltage detection, with respect to time of zero crossing.

Figure 4:
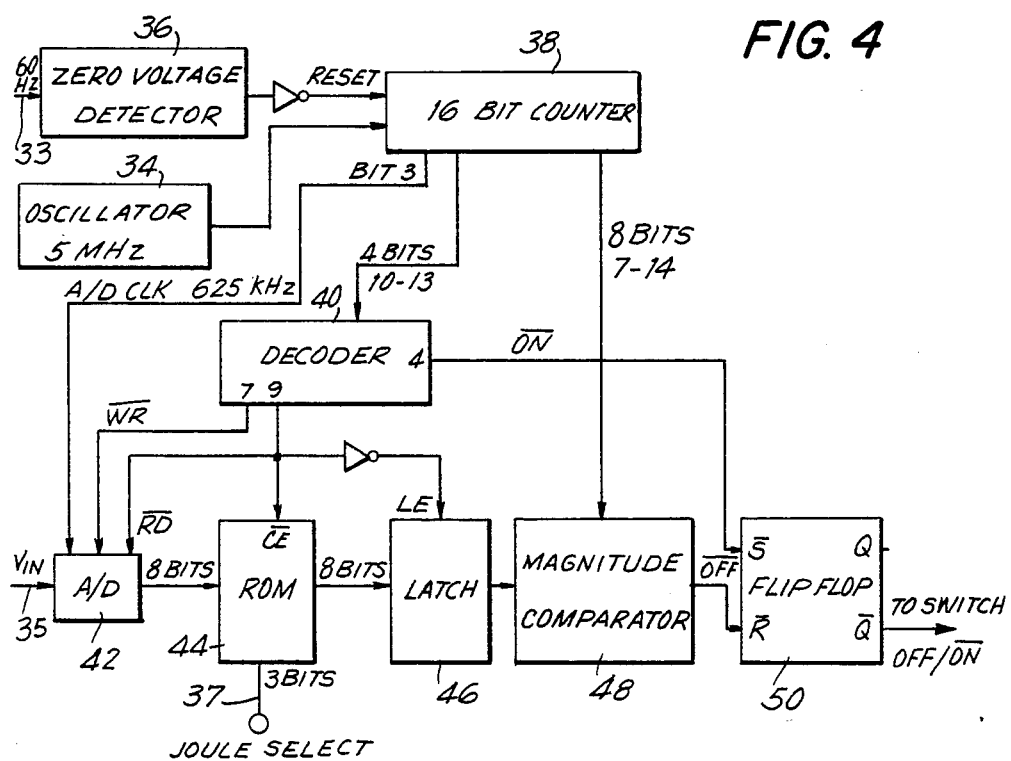
FIG. 4 illustrates, schematically and in block diagram form, the energy controller circuitry according the present invention.

A schematic block diagram for a presently preferred embodiment of the invention is shown in FIG. 4. The illustrated digital circuit serves to control the amount of energy delivered during a sine wave half cycle of unregulated or unsmoothed voltage amplitude.

The main inputs to the digital circuit include a clock signal from an oscillator 34 (in this embodiment, operating at 5 MHz), a full 60 Hz sine wave 33, a sensed voltage input 35 and an energy level selector input 37 which is connected directly to the memory portion 44 of the circuit. The sine wave 33 is delivered to a zero voltage detector 36 which determines when the beginning of each half cycle occurs. A CD3059 digital switch may be used. The output of the zero voltage detector 36 and the output of the oscillator 34 are applied to a 16 bit counter 38. As is wellknown, a 16 bit counter may be represented by four 4 bit counters, such as 7493 digital counters. The counter 38 has outputs connected to an A/D converter 42 which may be device AD0803, a decoder 40 such as device 7442, and a magnitude comparator 48 which may comprise two 8 bit 7485 comparators. The decoder 40 has outputs connected to the A/D converter 42, the circuit memory 44, a 4 bit latch 46 (7475 device) and an RS flip flop 50. The A/D connverter 42 is connected to the ROM 44 and the latch 46. The ROM 44 is also connected to the latch 46. The latch 46 is connected to the comparator 48 which is connected to the flip flop 50. The RS flip flop 50 controls the switch 32. The specific manner of interconnection of these digital circuit components is well within the level of ordinary skill in the art taking into consideration the illustrations of FIGS. 4 and 1 and the following operational description.

The operation of the invention is as follows, with reference to FIGS. 4, 3 and 2. When sine wave half cycle 10 of FIG. 2 begins at time zero, the zero voltage detector 36 will detect a voltage value of zero and will send a signal to the 16 bit counter 38. Counter 38 will at that moment reset to time zero and begins counting time by clock pulses from oscillator 34. The counter 38 will continously inform the decoder 40 and the magnitude comparator 48 of the elapsed time since zero crossing using an appropriate signal. Counter 38 will also provide the necessary operating clock signal to the A/D converter 42. At a predetermined time, (time point T1 of cycle 10 in FIG. 3), the decoder 40 will send a signal to the flip flop 50 to "close" switch 32. At the moment of switch closing, the a.c. line begins delivering power to the load. It should be noted that any value of time T1 may be chosen including time zero, but T1 is preferrably only near the time of zero crossing.

At another predetermined time which may be shortly after T1, (time point T4 in FIG. 3), the decoder 40 will signal the A/D converter 42 to sense the voltage across the load and convert the analog voltage signal into a digital signal. The sensing time T4 must be sufficiently after time T1, on the order of several microseconds, to ensure that the sensed voltage reflects any load induced voltage variation.

The circuit memory 44 is now described. As previously discussed, a unique sine curve signature can be derived for a detected voltage value, if the elapsed time since zero crossing is known. Thus, once the designer chooses such a sampling time, a lookup table can easily be devised wherein the particular signature is determined simply by the digital value of the measured voltage level at that sampling time.

Now, for each such sine curve signature, the elapsed time from switch closing for delivery of a predetermined amount of energy to the load is precisely known. Thus, for a given desired energy delivery, another lookup table is easily derived yielding total switch closing time (actually switch opening times) for various sine curve signatures.

In the presently preferred embodiment, the memory device is a 2716 EPROM, having 2048 memory locations each containing 8 bits. 8 bits are used for the digital representation of the measured voltage at time T4. These 8 bits are used to address 256 memory locations, each containing a switch opening time (T2 in FIG. 3) corresponding to one of 256 possible measured voltages.

Eight different locations, or pages of memory, can be addressed for any given measured voltage, the eight different pages corresponding to eight different desired delivered energy levels. The selector 37 provides a 3 bit address determining which of the eight different predetermined energy levels is to be used.

In this embodiment, but not to be viewed as a limitation of the invention, it can be seen that there is a compromise between the number of different energy levels and the accuracy of the detected voltage. Larger memory storage capacity reduces the need for such compromise.

Thus, the output of the A/D converter 42 is used in conjunction with the energy selector input 37 to look up a "turn off" or switch opening time T2 in the stored data of the memory device 44. This "turn off" data is sent through the latch 46 to the magnitude comparator 48. The magnitude comparator 48 compares the "turn off" time with the actual elapsed time from the 16 bit counter 38. Just when the actual time exceeds the "turn off" time, the magnitude comparator 48 outputs the signal via flip flop 50 and opens switch 32, turning off power to the load. The 16 bit counter 38 is reset when the next zero voltage is detected. The process continues 120 times per second for the 60 hertz sine wave used.

It will be readily appreciated that this energy controller circuit determines the correct amount of energy to be delivered in each half cycle without relying on any information obtained from previous cycles, thus eliminating a major source of error in actual energy delivered. The pulse width time is recomputed for each half cycle.

There are many advantages to the above described energy controller. The circuit is entirely digital, and its construction and adaptation to many different applications is a simple matter. As all voltage regulation has been eliminated, there are no load capacitors nor any other conventional regulating circuitry. There is no voltage smoothing, nor any need to control the energy as depending upon an average applied voltage. The circuit delivers the proper amount of energy to the load entirely independent of line voltage and load variations.

Furthermore, the speed of response of the controller is limited at this point only by the computing speed of the A/D converter 42, the other circuit components having faster response times. This is not the case where load capacitors are present across the load, as in U.S. Pat. No. 4,684,959, discussed above. Most notable have been the recent improvements in switching response time for the actual line switch 32.

Figure 5:
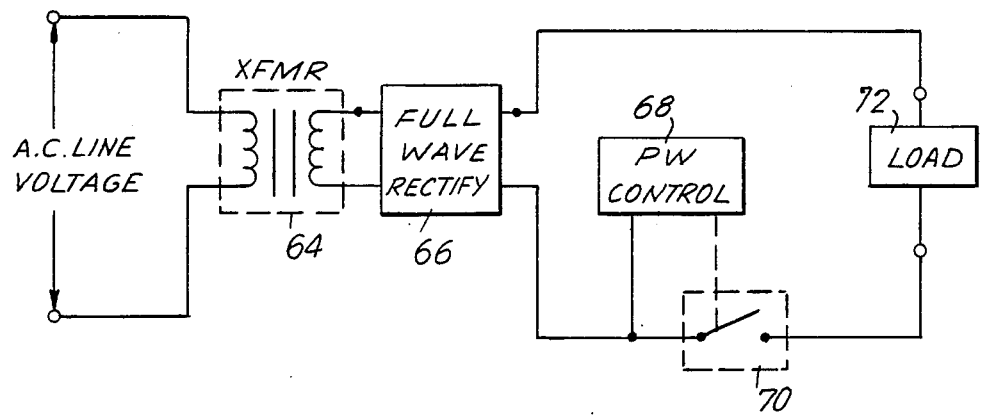
FIG. 5 is a simplified circuit in block diagram form of the present invention as used to provide direct current.

As illustrated in FIG. 5, the inventive energy controller is used to provide an unregulated d.c. source. Here the a.c. line voltage is applied to a transformer 64 for isolation and a full wave rectifier 66. The energy controller 68 appropriately opens and closes switch 70 (corresponding to switch 32 of FIG. 4) to provide d.c. voltage to the load 72. Because the energy controller acts to control the RMS sinusoidal voltage, no d.c. regulation is necessary.

The specific application of the invention to a thermal printer is now better appreciated, as it will be obvious to those skilled in the art how the digital circuit of FIG. 4 is applied to the the thermal printing system of FIG. 1. In particular, the output of flip-flop 50 controls digital switch S. As described above, in accordance with the present invention, the overall cost of a thermal printer can be reduced because of the use of an unregulated energy supply. Even the load capacitor of the Mori et al. '959 system is eliminated in the entirely digital control of the present invention. Thus the speed of thermal printing can be increased even further, while at the same time improving the consistency of dot contrast regardless of wide variations in load conditions, i.e., the number of enabled resistive dots.

Further comparing the presently described embodiment to the Mori et al. '959 circuit, the following additional advantages are obtained. The accuracy of control is no longer load or line sensitive, instead being primarily a function of the number of digital bits used to describe the measured voltage. Where 7 digital bits are used, for example, the measurement error is approximately 0.78 percent. Another important advantage is the ease of selecting the amount of energy to be applied to the load, enabling, for example, the use of thermal recording media having different thermal sensitivities. The number of different settings is limited only by available address bits and digital memory capacity.

In any electrical equipment requiring achievement of a particular temperature, the advantages of the invention are readily apparent. Those skilled in the art will further appreciate the desirability, simplicity and applicability of the invention to a wide variety of different situations where the quantity to be controlled is energy of one form of another, but the conventional manner of regulation has in the past been through voltage regulation, now unnecessary. For example, acoustic and light energy may be similarly controlled.

Figure 6:
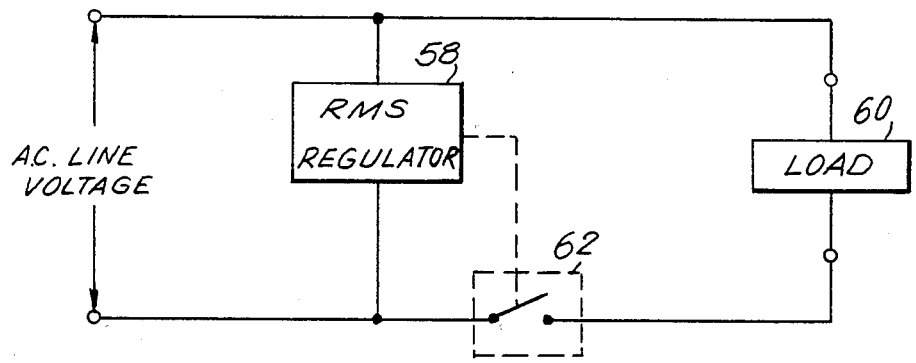
FIG. 6 is a simplified circuit in block diagram form of the present invention as used to provide alternating current.

It is apparent that the invention as described above is actually more than merely an energy controller. In applications where resistance of the load is not controlled, the same control concept can be applied as shown in FIG. 6 to control an a.c. RMS line voltage. Now the invention serves as a precision RMS voltage regulator which is both line and load independent.

Referring to FIG. 6, a simplified circuit of another possible use of the present invention is shown. In this particular environment, the invention is used to provide constant RMS (root mean squared) voltage regardless of source voltage variation between the specified low and high line voltage specifications and regardless of load variations. The energy controller previously described now becomes an RMS voltage regulator. Circuit 58 in this instance would be applied to an unrectified a.c. line voltage, and the zero crossings would be both positive-and negative-going. The switch 62 (corresponding to switch 32 of FIG. 4) is opened and closed to deliver RMS voltage to the load 60. Although the peak voltage of each half cycle may vary from one half cycle to another, the RMS voltage delivered to the load remains constant by regulating the time period of each half cycle during which the switch 62 is closed.

In particular, many electrical devices do not require heat to perform their intended functions, such as motors, radios, televisions and the like. Such products are designed to operate on line voltages which may fall anywhere in the conventional design ranges such as 95/126 volts or 190/252 volts. Because these products are designed to operate at the low nominal line voltages in any circumstance, applied excess voltage which is not converted to the products' output is thus wasted, being dissipated as heat.

The invention delivers a fixed RMS voltage to the load, regardless of the supplied line voltage and regardless of change in load. The low nominal voltage for which the product was designed may thus be maintained, saving energy. Furthermore, the product becomes more reliable as it no longer dissipates the excess supplied energy as heat, and components having lower temperature ratings may be used.

It will be readily appreciated that the apparatus of Mori et al. '959 does not and cannot serve as an a.c. RMS voltage regulator.

Numerous variations and modifications, in addition to those already described, will be plain to those skilled in the art. These changes do not depart from the basic spirit of the invention.

I claim:

1. Electrical control apparatus for controlling application of a line voltage source to an electrical load having a predetermined resistance, comprising:

first detection means connected to the line voltage source for determining a first reference time at which the line voltage source is at a predetermined first level;

second detection means connected to the line voltage source for determining a second level of the line voltage source at a predetermined second reference time;

memory means responsive to the first and second reference times and the second level of the line voltage source, the memory means containing data representative of an accumulating amount of delivered energy as a time interval after the first reference time increases; and comparator means responsive to the memory means and to a predetermined amount of delivered energy for stopping application of the line voltage source to the electrical load after a pulse interval at which time the accumulated amount of delivered energy substantially equals the predetermined amount of delivered energy.

2. The electrical control apparatus according to claim 1, wherein the predetermined first level of the line voltage source is substantially zero.

3. The electrical control apparatus according to claim 1, wherein the memory means further includes data representative of a plurality of different selectable predetermined amounts of delivered energy which can be provided by the line voltage source to the electrical load, the comparator means being responsive to a selected one of the different selectable predetermined amounts of delivered energy.

4. Thermal printing apparatus comprising:

a thermal printhead including a plurality of heat-producing elements arranged in the form of an array, the plurality of heat-producing elements being selectively activated in accordance with an activation signal applied thereto, the thermal printhead including a common connection line to a line voltage source and to which one electrical connection of each of the plurality of heat-producing elements is commonly connected;

first detection means connected to the line voltage source for determining a first reference time at which the line voltage source is at a predetermined first level;

second detection means connected to the line voltage source for determining a second level of the line voltage source at a predetermined second reference time;

memory means responsive to the first and second reference times and the second level of the line voltage source, the memory means containing data representative of an accumulating amount of energy delivered to each one of the plurality of heat-producing elements as a time interval after the first reference time increases; and comparator means responsive to the memory means and to a predetermined amount of delivered energy for stopping application of the line voltage source to the plurality of heat-producing elements after a pulse interval at which time the accumulated amount of delivered energy substantially equals the predetermined amount of delivered energy.

5. The thermal printing apparatus according to claim 4, wherein the predetermined first level of the line voltage source is substantially zero.

6. The thermal printing apparatus according to claim 4, wherein the memory means further includes data representative of a plurality of different selectable predetermined amounts of delivered energy which can be provided by the line voltage source to each one of the plurality of heat-producing elements, the comparator means being responsive to a selected one of the different selectable predetermined amounts of delivered energy.

7. Electrical control apparatus for controlling application of a line voltage source to an electrical load, comprising:

first detection means connected to the line voltage source for determining a first reference time at which the line voltage source is at a predetermined first level;

second detection means connected to the line voltage source for determining a second level of the line voltage source at a predetermined second reference time;

memory means responsive to the first and second reference times and the second level of the line voltage source, the memory means containing data representative of a rising RMS voltage level as a time interval after the first reference time increases; and comparator means responsive to the memory means and to a predetermined RMS voltage level for stopping application of the line voltage source to the electrical load after a pulse interval at which time the rising RMS voltage level substantially equals the predetermined RMS voltage level.

8. The electrical control apparatus according to claim 7, wherein the predetermined first level of the line voltage source is substantially zero.

9. The electrical control apparatus according to claim 7, wherein the memory means further includes data representative of a plurality of different selectable predetermined RMS voltage levels which can be provided by the line voltage source to the electrical load, the comparator means being responsive to a selected one of the different selectable predetermined RMS voltage levels.

* * * * *

UNITED STATES PATENT AND TRADEMARK OFFICE
CERTIFICATE OF CORRECTION

PATENT NO. : 4,764,858
DATED     : August 16, 1988
INVENTOR(S) : Leo Valenti

It is certified that error appears in the above—identified patent and that said Letters Patent is hereby corrected as shown below:

Change the formula at col. 4, line 62 from

" $E = \int_{t_1}^{t_2} V^2/R \, dt$ "

to

-- $E = \int_{t_1}^{t_2} V^2/R \, dt$ --.

Signed and Sealed this

Twentieth Day of December, 1988

*Attest:*

DONALD J. QUIGG

*Attesting Officer*     *Commissioner of Patents and Trademarks*